United States Patent [19]
Rothe et al.

[11] Patent Number: 5,137,770
[45] Date of Patent: Aug. 11, 1992

[54] GLASS BODY CONTAINING A MATERIAL FOR ADHESION, AND PROCESSES FOR ITS PRODUCTION AND APPLICATION

[75] Inventors: Holger Rothe, Oberengstringen; Lutz Zabel, Birmensdorf, both of Switzerland

[73] Assignee: Sika AG, vorm. Kasper Winkler & Co., Zurich, Switzerland

[21] Appl. No.: 596,315

[22] Filed: Oct. 12, 1990

[30] Foreign Application Priority Data

Oct. 12, 1989 [CH] Switzerland .................. 3723/89

[51] Int. Cl.$^5$ ............................... B32B 9/00
[52] U.S. Cl. .............................. 428/192; 428/204; 428/206; 428/426; 296/84.1; 156/60
[58] Field of Search ............... 428/192, 426, 204, 206; 296/84.1; 156/60

[56] References Cited

U.S. PATENT DOCUMENTS

| | | | |
|---|---|---|---|
| T991,001 | 3/1980 | Donovan et al. | 428/40 |
| 3,387,416 | 6/1968 | Martin | 52/208 |
| 4,551,372 | 11/1985 | Kunert | 428/40 |

FOREIGN PATENT DOCUMENTS 3409960 10/1984 Fed. Rep. of Germany .
2266669 4/1974 France .

*Primary Examiner*—Patrick J. Ryan
*Assistant Examiner*—W. Krynski
*Attorney, Agent, or Firm*—Burns, Doane, Swecker & Mathis

[57] ABSTRACT

Disclosed is a glass body suitable for cementing to a further material. At the time of cementing, there is at least one profile of a cement on the glass body, and it is already solidified at the time of cementing and serves as a range spacer. Furthermore, there is a profile of a second cement on the glass body which cement is still moldable and has adhesive characteristics at the time of cementing. When producing the adhesive connection, the second cement is formed and pressed against the other material. Because the profile of the second, still adhesive cement is directly on the glass body or possibly a layer of a material impermeable to ultraviolet or, where necessary, an intermediate layer of primer, a very good adhesion can be achieved.

19 Claims, 1 Drawing Sheet

GLASS BODY CONTAINING A MATERIAL FOR ADHESION, AND PROCESSES FOR ITS PRODUCTION AND APPLICATION

BACKGROUND OF THE INVENTION

There are many industrial applications where it is necessary to cement glass bodies, particularly glass panes, to other materials. In many applications, this cementing must be durable and must withstand considerable mechanical stresses, as well as stresses imposed by atmospheric influences such as water, surrounding temperatures, sunlight, etc., for long periods of time.

Durable adhesive connections between glass bodies and other materials are useful in a number of applications such as facade glazing, and anchoring glass panes or laminated glass panes to window frames. Particularly rigorous standards must be met in the vehicle industries where durable cementing of glass panes to corresponding body parts is required; e.g., adhesion of windshields, and rear and side windows which cannot be opened. The requirements associated with windshields are particularly strict because the corresponding point of adhesion must withstand great mechanical stresses in the event of impact.

In many applications it is desirable to produce an effective connection between a glass body and another material by cementation because the connection can provide improved watertightness. Furthermore, in vehicle construction cemented panes contribute substantially to the torsional strength since a passenger compartment with a cemented panes is less vulnerable to torsional forces than passenger compartments where the panes have not been cemented. In addition, when glass panes have been cemented there is increased soundproofing or noise reduction, and weight reduction.

In cementing a vehicle pane, the cement will be applied either to the glass pane or a flange on the vehicle, and the pane will be brought into the proper position by application of pressure. When the pane is precisely positioned, it is necessary to use range spacers which prevent the thickness of the adhesive layer from being uneven. Such a procedure is described in the French document FR-A2 266 669. In that case, both bodies to be connected preferably have a cylindrical shape and are pressed together in such a way that an intermediate space is created between the surfaces. The space is closed off by two torus-shaped elastic sealing rings. The rings are fixed using two grooves that are embedded in the surface of the metal body. Two opposite openings in the metal body make it possible to completely fill the delimited space with liquid cement. Cementing a windshield of safety glass to a vehicle frame is also described in U.S. Pat. No. 4,551,372. In the process described therein, the inserted pane of safety glass has at least two glass layers that are connected together by a plastic layer. The outer glass layer of safety glass projects beyond the glass layer of safety glass facing the vehicle interior in a manner such that the edge area of the windshield is structured in steps. The cement which is used to cement the windshield is so flowable that it seals the stepped area and prevents penetration of humidity into the intermediate plastic layer of the safety glass. In accordance with one type of construction, air- and water-tightness of the stepped edge area is achieved by an adhesive mixture that can be hardened and, is available in a completely hardened state; i.e., no longer adhesive at the time of cementing the vehicle pane. This edge made of the hardened adhesive is accordingly provided with a groove-shaped recess into which a further adhesive is then introduced. The additional adhesive must be compatible with the already completely hardened adhesive.

The aforementioned procedure of anchoring a vehicle pane with an already hardened, no longer adhesive layer of a first adhesive and then introducing a second adhesive, which is still adhesive at the glazing process, is described in greater detail in U.S. Pat. No. 4,571,278 and in German Patent No. 3,409,960. This procedure is often referred as flush-glazing, and represents a further development of direct glazing by direct application of a adhesive cement to the glass pane or to the vehicle flange (direct glazing is likewise referred to as direct glazing). In flush-glazing, the profile of the cement already hardened at the time of cementing acts as a range spacer. Positioning the pane during installation is substantially simplified by this process. In fact, a few vehicle manufactures have already begun the standard installation of windshields and rear windows by flush-glazing, or will begin by the first part of 1991.

As described in German Patent No. 3,409,960 and U.S. Pat. No. 4,571,278, in flush-glazing the cement which adheres at the time of cementing is not brought into direct contact with the glass pane, but is applied directly to the edge area of the glass body or the profile of solidifiable cement, via an intermediate layer of a primer. After the primer has completely hardened and is solidified, a second cement is applied to it, preferably in the form of a profile that is inserted into a groove-shaped recess of the profile of the first cement. There is, however, a problem of intermediate adhesion between the two different cements. Therefore, the initial hardened cement strand should be either chemically or mechanically reactivated before applying the second cement strand. The contact surface between the two cement strands can also be enlarged by corrugation.

Although the adhesion problems of the second, still adhesive cement to the first, already hardened cement, can be addressed by chemical reactivation or mechanical reactivation of the profile surface of the hardened cement, these reactivations are not industrially practical solutions. The quality and extent of the reactivation cannot be controlled. Furthermore, a new work-place would be required for the reactivation stage; an undesirable additional cost.

Accordingly, the general object of the present invention is to eliminate the problems relating to adhesion of a second cement profile, still having adhesive characteristics at the time of cementing, to the first already hardened, cement profile.

SUMMARY OF THE INVENTION

As noted above, one object of the invention relates to the elimination of problems occurring in flush-glazing procedures, particularly poor adhesion of a second cement profile still displaying adhesive properties at the time of cementing, to a profile of a first cement that is already solidified at the time of cementing and which serves as a range spacer during cementing.

During studies relating to this purpose, it was discovered that when a cement strand made of the first cement is only one to three weeks old, the adhesion of the second cement still displaying adhesive characteristics at the time of cementing, is satisfactory. However, if the profile of the first cement is aged several weeks or months, before the second profile of the cement is applied, cementing is unsatisfactory because the composition of the first cement is nearly identical to the composition of the second cement. Furthermore, it was discovered that results are extremely unpredictable. For example, a slight variation in components such as fillers, thixotropifying agents, etc., of the composition of the first cement and/or the second cement, can lead to unsatisfactory adhesion of the two cement profiles.

The tests also showed that, to the contrary, adhesion of the first cement to the glass body or to a layer on the glass body made of a material impermeable to ultraviolet light or a layer of primer on the glass body, is not problematic. It was previously assumed that the second cement used in flush glazing, which still has adhesive characteristics at the time of cementing of the glass body, would display good adhesion to the first cement profile. Therefore, the second cement had always been applied to the first cement profile in flush glazing. Surprisingly, the tests showed the exact opposite. The adhesion of a second cement profile directly to the glass body or to a layer of a material impermeable to ultraviolet light, wa substantially better than the adhesion to the already hardened profile of the first cement. Furthermore, adhesion of the second cement to the glass or the UV blocking layer is not particularly sensitive to slight variations in components of the intermediate cement layer.

By the present invention, the advantages of flush-glazing relating to using an already hardened cement as a range spacer can be maintained while overcoming the unpredictable and disadvantageous adhesion characteristics of the second cement. Those characteristics of the second cement can be avoided by applying it directly to the glass body instead of to the first, already hardened, cement profile.

Thus, one aspect of the invention relates to a glass body, preferably a glass pane, which can be provided with a additional material by cementing. The glass body can include a layer that is essentially impermeable to ultraviolet light and/or, where necessary, a layer of primer located on a surface of the outer edge area of the glass body. In the outer edge area of the glass body, either touching it and/or touching the primer layer, there is at least one profile of a first cement. This first cement is already solidified at the time of cementing the glass body to the other material and serves as a range spacer. There is also at least one profile of a second cement. This second cement exhibits adhesive characteristics at the time of cementing.

According to the invention, the profile of the second cement is in the edge area of the glass body but inside at least one profile made of the solidified first cement. The profile of the second cement can placed directly on the surface of the glass body and/or on the surface of a layer impermeable to ultraviolet light, if present, and/or the surface of a primer, if present.

DETAILED DESCRIPTION OF THE PREFERRED EMBODIMENTS OF THE INVENTION

According to a preferred aspect of the invention, the second cement is stable and pasty before its hardening or complete hardening or reticulation, and is solid after its complete hardening and reticulation. The cement of the second profile is preferably flexible and elastic after complete hardening and reticulation.

According to another aspect of the invention, the first profile, which is already solidified at the time of cementing and serves as a range spacer, is also stable and pasty before its hardening or complete hardening, or reticulation, and is solid and preferably also flexible and/or elastic after complete hardening and reticulation.

In the glass bodies according to the invention, the second cement and, especially preferably, also the first cement are preferably chosen from plastic materials. Examples of preferred materials include elastomers such as polyurethane, silicon, polysulfide, and synthetic and natural rubbers; duromers made flexible, such as epoxides, phenol resins and polyurethanes; and thermoplastics made flexible, such as acrylic resins, polyvinyl-chlorides, polyamides, and thermoplastic rubber combinations.

It is particularly preferable that the second cement and, preferably also, the first cement, be made of a two-component cement or a reactive one-component cement, with preferred two-component cements being those based on one component with at least on free isocyanate group and one hardening component, and preferred one-component cements, and those based on one component with at least one free isocyanate group. With these one-component cements, it should be possible to carry out hardening by the reaction of the component with at least one free isocyanate group with water, or surrounding humidity, and/or when there is a concealed hardener in the composition, by activating the hardener by heating and/or by the influence of water (e.g., surrounding humidity).

Particularly preferred cements are still moldable after their application upon cooling to room temperature. After application, they harden into a product with elastic characteristics through the influence of water, particularly humidity. Examples include those one-component cements described in European Patent No. 244,608 and European Patent No. 255,572, both assigned to SIKA AG.

Those one-component cements contain a prepolymeride which is not completely reticulated with isocyanate base, still having free reactive isocyanate groups. An excellent adhesion of the cement profiles to the glass substrate can be achieved by this reactive prepolymeride. If air access to the cement profile is prevented, the cement profile retains its moldability and reactivity during long storage periods. Accordingly, these cements are especially preferred as the second cement profile(s) of the glass body according to the invention. If the glass body is cemented to the other material using this second cement profile, it is molded, and due to the reactive groups of the prepolymer with a isocyanate base, an excellent cementing to the other material also takes place. Due to contact with humidity after the cementing step, reticulation of the free isocyanate groups of the binder occurs while a product with elastic and flexible characteristics is formed.

According to a preferred aspect of the invention, the first cement has a cross-section in the shape of a triangle, and the second cement also has a cross-section in the shape of a triangle when it is applied. This second profile is stable and pasty, is permanently moldable under the influence of outside forces during the cementing procedure, and guarantees a solid connection with elastic characteristics after complete hardening and reticulation.

In the glass body of the invention, a profile made of the first cement, which is already solidified when the glass body is cemented, is located in the outer edge area of the glass body. And, a profile of the second cement is also attached in the edge area of the glass body but inside the profile made of the solidified first cement. When the glass body is cemented, the profile of the second cement is durably molded, and the hardened profile of the first cement serves as a so-called cement deterrent in the process (it prevents the moldable cement from emerging from the composite structure). In vehicle applications, this prevents the vehicle body from being soiled.

Plastics are often damaged by the influence of ultraviolet light after long influence periods. It is therefore often necessary to protect profiles of plastic from ultraviolet light passing through the glass body by applying a layer that is essentially impermeable to ultraviolet light. Accordingly, in the glass bodies of the invention in the outer edge area where the profile of the first cement and the profile of the second cement is applied, there can be applied a layer of material which is essentially impermeable to ultraviolet light. This layer is generally referred to as a "ceramic layer".

Where necessary, another layer of primer can be applied to the ceramic layer or on parts of the ceramic layer in such a way that the profile made of the first cement and/or the profile made of the second cement are touching the primer layer. As an intermediate layer made of a primer can suffer from aging problems when it must be used over long periods of time, however, a primer layer will normally be omitted in the glass body according to the invention.

Particularly when the glass body to be cemented is a windshield or a rear window, it is advantageous to provide the outer profile made of the first cement as a packing washer or in a form which functions as a packing washer.

When cementing the glass body according to the invention, the second cement often attains sufficient solidity immediately after being cemented to the other material. Therefore, further fixing is not normally necessary. If desired, however, up to the time when the second cement has achieved sufficient solidity, the initial adhesion of the cemented glass body can be improved by initially fixing the cemented glass body using a contact adhesive.

Therefore, according to a further aspect of the glass body according to the invention, there is provided a contact adhesive in the upper areas on at least one profile made of the first cement; preferably in a groove-shaped recess of this profile. The contact adhesive is preferably covered by a removable protective layer where necessary, typically in the form of a double-sided adhesive tape, foamed or unfoamed.

If, in the case of the glass body according to the invention the profile of the second cement is an adhesive that, with the influence of water (e.g., surrounding humidity), leads to a complete hardening or reticulation of the initially still moldable profile of the second cement, then the glass body or the area of the glass body on which the profile of the second cement is situated must be protected from contact with humidity during storage. This is the case, for example, when the profile of the second cement contains a prepolymeride (that also has free isocyanate groups) which, under the influence of humidity, hardens into a solid product with elastic characteristics due to the reactivity.

Therefore, according to a particularly preferred embodiment of the invention, the second cement contains or consists of a prepolymeride. The prepolymeride and/or a concealed hardener present in the second cement causes a complete hardening and reticulation of the second cement while forming a solid, preferably also flexible and/or elastic product under the influence of water (e.g., the surrounding humidity). And, the profile of the second cement is protected from contact with humidity by a protective layer or corresponding packaging up to the time of cementing the glass body to a further material.

If a layer that is essentially impermeable to ultraviolet light is placed on the surface of the edge areas of the glass body according to the invention, then the first cement and also the second cement, and any other profiles of the first and second cements, should preferably touch the layer essentially impermeable to ultraviolet light. Or, an intermediate layer of primer can be arranged between the layer essentially impermeable to ultraviolet light and the contact surface of the profile of the first cement and/or the contact surface of the second cement and/or the contact surfaces of any other profiles of the first cement or the second cement present, or portions thereof.

A further object of the present invention is to provide a process for producing the glass body according to the invention. The process is characterized in that at least one profile of a first cement is applied to the outer edge area of the glass body; in direct contact with it and/or in direct contact with a layer essentially impermeable to ultraviolet light, if present, and/or in direct contact with a layer of primer, if present. At application, this first cement is stable but is not hardened or not completely hardened or reticulated, and has pasty characteristics. This first cement is allowed to harden and reticulate after its application so that it becomes solid and preferably flexible and/or elastic. Then, at least one profile of a second cement is applied inside the outer profile of the first cement; the profile of the second cement being a cement that is stable and pasty before hardening or complete hardening or reticulation. But, it is permanently moldable under the influence of outside forces, and is solid and also preferably flexible and/or elastic after its complete hardening and reticulation. And, the complete hardening of the profile of the second cement is only initiated at the cementing of the glass body to a further material and/or immediately before cementing the glass body to a further material.

In the aforementioned production process, the profile of the first cement is appropriately applied to the glass body at the facilities of its manufacturer and is allowed to harden and reticulate in such a way that this profile serves as a range spacer during cementing and achieves its final solidity and preferably its desired flexibility and/or elasticity. This is quite advantageous when packaging and transporting the glass bodies as this profile serves as a range spacer and represents a protection of the glass bodies against mechanical stress. For example, several windshields of the same structure can be stacked in a single packaging because the corresponding profiles of the first cement will act as a range spacer between the individual windshields.

In the production process of the glass bodies, the profile of the second cement, which is stable and pasty before its hardening or complete hardening, or reticulation, but is permanently moldable under the influence of outside forces, can be applied before the profile of the first cement or after the profile of the first cement. Accordingly, it is possible to apply the profile(s) of the second cement on the glass body at the facilities of its manufacturer. If, the profile(s) of the second cement are of the type of one-component cement compositions that contain a concealed hardener, and this concealed hardener is activated by a heating step immediately before cementing of the glass body, then no special measures are required when packaging such glass bodies provided with both the first cement profile(s) and the second cement profile(s). If, however, profile(s) of the second cement are of the type of one-component cement composition that hardens completely under the influence of water, the applied profiles of the second cement must be protected from contact with water during storage. This can be done, for example, by appropriate packaging, or by the application of a removable watertight layer (e.g., a removable strip of an inert plastic).

It can also be advantageous to only apply the profile of the second cement to the glass body immediately before cementing the glass body to the other material (e.g., at the vehicle manufacturer's facilities).

Depending on the data, manual application of the profile(s) of the second cement with simple cartridges can be done by application devices for large-scale technical processing (e.g., robots). A further object of the present invention is the use of the glass body according to the invention for cementing to at least one other material. This use is characterized in that the profile(s) of the second cement (on the glass body and having adhesive characteristics at the time of cementing) is brought into contact with the other material under the influence of outside forces. During this cementing step, the profile of the second cement is permanently molded and remains adhered to the further material. After complete hardening and reticulation of the second cement, a solid intermediate layer is formed, with this intermediate layer preferably also being flexible and/or elastic. When carrying out the cementing step, the profile of the first, already solidified, cement on the glass body serves as a range spacer.

As already mentioned, in the case of specially preferred glass bodies according to the invention the profile of the second cement is in a non-hardened or not completely hardened or reticulated state at the time of cementing the glass body. In this case, when using corresponding glass bodies the complete hardening or reticulation of the cement is only initiated just before cementing, and complete hardening or reticulation of the second cement only takes place after the glass body has been brought into contact under pressure with the material to be cemented.

According to a preferred aspect of using the glass bodies according to the invention, the profile(s) of the first cement ar applied to the glass body at the manufacturer's facilities. And, the profile(s) of the second cement are either (i) also applied at the facilities of the manufacturer of the glass body, with measures being taken to prevent hardening or complete hardening or reticulation, of the profile of the second cement during subsequent storage of the glass body (e.g., using humidity-resistant packaging). Or, (ii) the profile(s) of the second cement is only applied to the surface of the outer edge area of the glass body and/or a layer essentially impermeable to ultraviolet light and/or a layer of primer, immediately before cementing to the other material.

Figure 4:
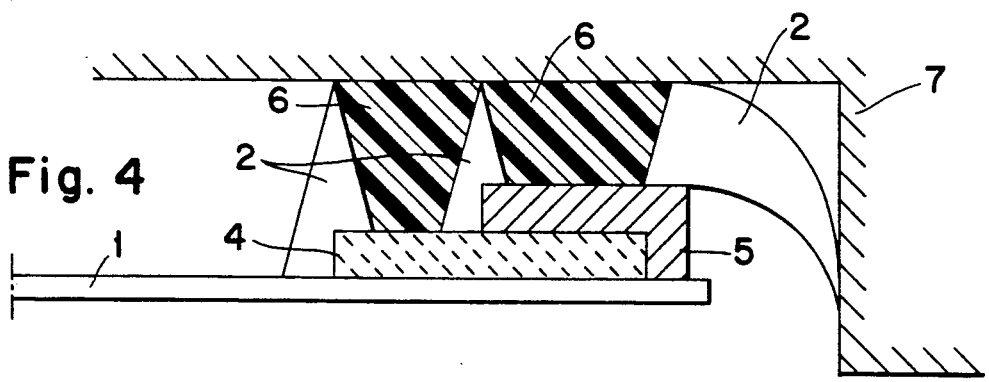

In the FIG. 4, there is shown a cross-sectional diagram of a glass body according to the invention which is cemented in a frame.

Figure 5:
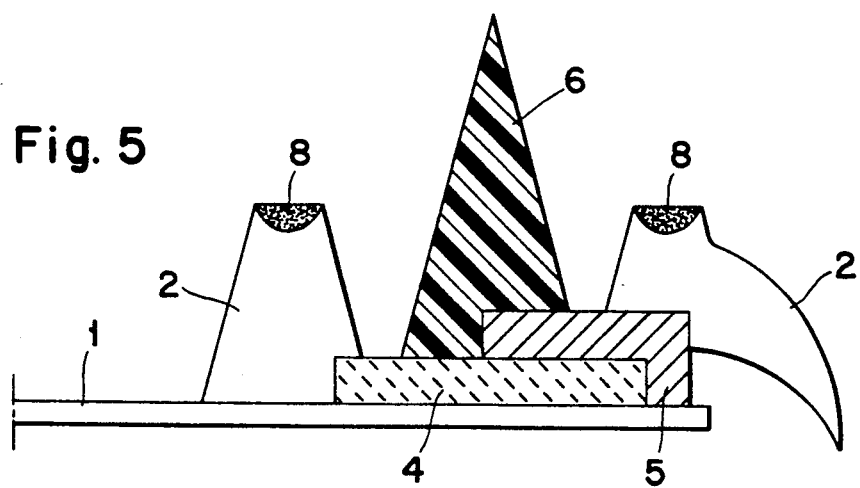

In FIG. 5, there is shown a cross-sectional diagram wherein an impermeable layer is placed on a glass body.

Figure 1:
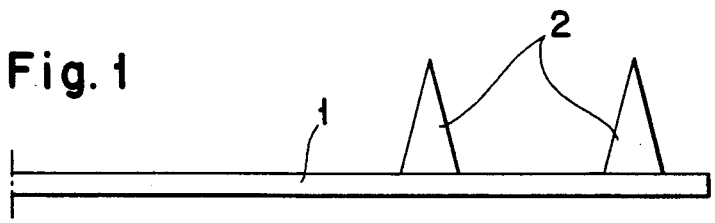
In FIG. 1, a simple form of a glass body according to the invention is shown in a cross-sectional diagram. Two profiles of a first cement are shown directly on a glass body in the form of a glass pane.
Figure 2:
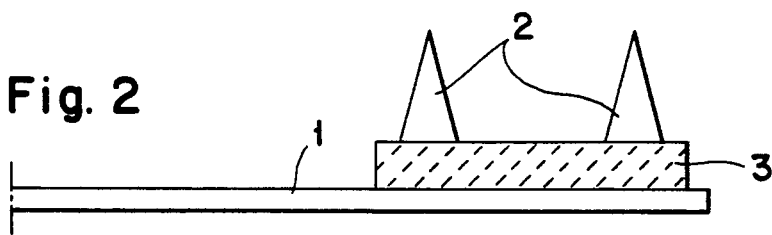
FIG. 2 shows a cross-sectional diagram of glass body and profiles of the a first cement, having therebetween an intermediate layer.
Figure 3:
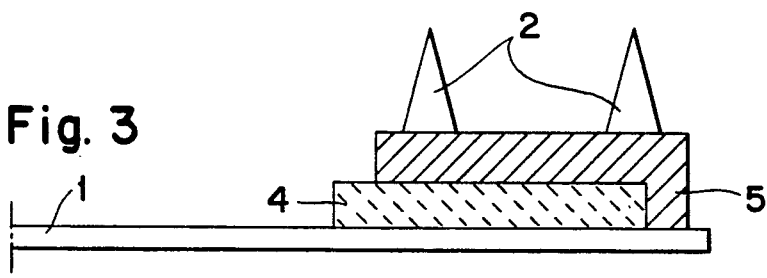
FIG. 3 is a cross-sectional diagram showing a structure having a layer of material which is essentially impermeable to ultraviolet light on a glass body.

Preferred structure types of the glass bodies according to the invention are explained in greater detail with reference to FIGS. 1 to 5. In these figures, possible cross-section profiles of the glass bodies according to the invention are shown. In FIGS. 1, 2 and 3 the triangular profiles are of the first cement. The second cement remains to be cemented to the glass body before utilization, preferably between the two profiles of the first cement.

In FIG. 1, the simplest form of construction of the glass body is shown in a cross-sectional diagram. Two profiles (2) of the first cement are shown directly on glass body (1) in the form of a glass pane.

FIG. 2 shows a cross-sectional diagram of glass body (1) and the profiles (2) of the first cement, having therebetween an intermediate layer (3). The intermediate layer (3) is either a material essentially impermeable to ultraviolet light (a ceramic edge) or a primer, or any combination of a ceramic edge and primer.

The left profile (2) may be completely on glass body (1) or it can cover glass body (1) and intermediate layer (3). In this manner, an adhesion of one profile to two different materials is produced.

FIG. 3 is a cross-sectional diagram showing a structure having a layer of material (4) which is essentially impermeable to ultraviolet light on the glass body (2). This layer may be an annealing color impermeable to light. A layer of primer (5) may be placed over the layer (4) impermeable to visible light and ultraviolet light. Primer layer (5) can either completely or partially cover impermeable layer (4). Primer (5) can also laterally surround at least a point of the edge of impermeable layer (4). In FIG. 3, the right edge point is shown as being laterally surrounded. The two profiles (2) of the first cement are present on primer (5). By choice, left profile (2) can be placed completely on primer (5). Or, if primer (5) does not completely cover impermeable layer (4), it can cover primer (5) and impermeable layer (4) in equal or unequal portions. If primer (5) does not completely cover impermeable layer (4), left profile (2) can also cover primer (5), impermeable layer (4) and glass body (1) in equal or unequal portions. In this manner, adhesion of a profile can be obtained to three different materials.

Left profile (2) can also be placed completely on impermeable layer (4). Or, left profile (2) can be placed completely on glass body (1). It is also possible for left profile (2) to cover impermeable layer (4) and glass body (1) in equal or unequal portions. In this manner, adhesion of the profile to two different materials can be obtained.

In the types of structures illustrated by FIGS. 1, 2 and 3, profile (2) of the first cement which is arranged on the inside portion of the glass body can be omitted. In many applications, this type of structure may be preferred although structures with two profiles of the first cement is often preferred.

In structures of the types illustrated in FIGS. 1, 2 and 3, the profile of the second cement will be applied to the glass body to the left of the right profile of the first cement (2). This is done so that the outer profile of first cement (2) acts as a "cement deterrent" as soon as the profile of the moldable second cement is molded in the cementing step or is crushed.

In FIG. 4, there is shown a cross-sectional diagram of a glass body according to the invention which is cemented in a frame. On glass body (1) there is an impermeable layer (4). Layer (4) is partially covered by primer (5). Primer (5) can also laterally surround at least a portion of the edge of impermeable annealing color layer (4). In FIG. 4, the right edge point is shown as being laterally surrounded.

Right profile (2) of the first cement has the shape of a packing washer and is placed completely on primer (5). A middle profile (2) of the first cement can cover impermeable annealing color layer (4) and primer (5) in equal or unequal portions.

According to a preferred type of structure like that of FIG. 4, however, middle profile (2) of the first cement is omitted. The left profile (2) of the first cement can be omitted as well. In the structure illustrated by FIG. 4, however, left profile (2) of the first cement covers the impermeable annealing color (4) and glass body (1) in equal or unequal portions. This provides an adhesion of profiles (2) to different materials.

In the type of structure illustrated by FIG. 4, before cementing the glass pane, profiles of a second, still permanently moldable cement (6) (also preferably in the form of a triangle) are applied between the right and middle profiles of first cement (2), as well as between the middle and left profile of the cement (2). The triangular profiles of second cement (6) may even project over the profiles of first cement (2). When cementing glass body (1) to the other material (7), the two profiles of second cement (6) are permanently molded, i.e. crushed, in such a way that in the cemented state, cement (6) will completely fill the space between the profiles of first cement (2). After cementing the glass pane, solidified cement (6) will adhere to frame (7), as well as to impermeable layer (4) and primer (5). If left profile (2) is placed completely on glass body (1), and there remains a space between this profile and impermeable layer (4); then cement (6) will additionally adhere to the surface of glass body (1).

In the type of structure illustrated by FIG. 4, the middle cement profile of first cement (2), as well as the innermost cement profile of first cement (2), can be omitted. In such a case, only a single cement profile of second cement (6) will be necessary.

In FIG. 5, there is shown a cross-sectional diagram wherein an impermeable layer (4) is placed on glass body (1). On top of layer (4), a primer (5) may be placed such that it completely or partially covers impermeable layer (4). Primer (5) can also laterally surround at least an edge point of impermeable layer (4). In FIG. 5, the right edge point is shown as being laterally surrounded. Right profile (2) of the first cement, which is in the form of a packing washer, is placed on primer (5). All modifications, as described in connection with FIG. 3, may also be made.

In addition, a contact adhesive (8) can be placed on the upper portion of the two profiles (2) of the first cement. A profile of the second cement (6) is placed in the space between profiles (2). It is also possible for profile (2) to completely be contact adhesive (8).

If glass bodies (1) (preferably glass panes) are pressed into a frame, contact adhesive (8) will immediately fix the plane. This fixing must last at least until the structural forces of cement (6) have sufficiently developed (e.g., 3 to 7 days). If, a second cement (6) is used whose complete reticulation takes place by the action of water, then the cement will generally have a so-called "open time" (in which the cementing can take place) of more than two hours as soon as access to humidity is guaranteed.

In the type of structure represented by FIG. 5, the profile of the second cement (6) can advantageously be a one-component cement which is activated immediately before cementing by a heating step. Also, it is not at all harmful if contact adhesive (8) completely or partially loses its adhesive characteristics as soon as second cement (6) is completely or almost completely hardened or reticulated, and taken over the function of an age-resistant cementing.

In the type of structure shown by FIG. 5, as soon as cementing to the other material has taken place, durably moldable cement (6) still showing adhesive characteristics is pressed into the space between outer profile (2) and inner profile (2) of the first cement by application of pressure during cementing. The resulting structure will then be similar to that of FIG. 4 (but omitting middle profile (2) of the first cement).

In the types of structures illustrated by FIGS. 4 and 5, it can be seen that second cement (6) can touch the profile of the first cement after successful cementing of the glass body. Durable cementing between the profiles of first cement (2) and second cement (6) can take place at the points of contact (see FIG. 4). If, however, cementing at these adhesion points between first cement (2) and second cement (6) is lacking, no adverse consequences will result with respect to overall cementing. There will be a corresponding anchoring of glass pane (1) to the other material (7) by contact of the profile of second cement (6) (pressed during cementing) with glass body (1) (or any other layers present thereon) and other material (7).

With the glass bodies according to the invention, the profile(s) of the first cement and the profile(s) of the second cement ca have a variety of shapes. For example, the cross-section of the individual profiles can have a triangular shape or a square-type shape such as a rectangle, a trapeze, a trapezoid or a square.

The layer impermeable to ultraviolet light, e.g. a layer of a so-called ceramic material or an annealing color (see layer (4) in the figures) can have a thickness of about 200 to about 500 micrometers.

If a primer layer is present, (see layer (3) in FIG. 2, and layer (5) in FIGS. 3, 4 and 5, it can have a thickness of around 200 micrometers, for example.

If the glass body is a glass pane, it will generally have a thickness of 2 to 5 mm. Tests showed that the invention using a profile of a second cement will provide excellent adhesion to a wide variety of types of glass. Examples include crystal glass, lead glass, laminated glass, float glass and pyrex glass.

The glass body according to the invention can be cemented to a wide variety of other materials, having a wide variety of shapes, because the profile(s) of the second cement are permanently moldable. Accordingly, the other material can be any metal or metal alloy such as aluminum, iron, and iron alloys such as steel. The metals can also have surface coating(s). For example, they can be lacquered. Furthermore, the other material can be a plastic such as glass fiber strengthened plastics. Preferred plastics include polyester, epoxy resins, polycarbonate, polyvinylchloride and additive polymerides such as ABS.

Although a preferred application of the glass body according to the invention is for cementing glass bodies in vehicle construction, the glass bodies of the invention are also well suited for the production of insulating glass. Advantages are also obtained when using the glass bodies for the production of glass facades.

Preferable primer layer materials include those of silane-modified polyurethane materials such as those described in U.S. Pat. Nos. 3,453,243, 3,627,722 and 3,707,521. Other examples include primers of a methacrylate or polyvinylbutrol base.

The invention will now be explained in greater detail with reference to the following example. However, the example should not in any way be construed as limiting the invention.

EXAMPLE

The glass panes used were provided at the manufacturer's facilities with a layer of a material impermeable to ultraviolet light on their edge areas (they are designated as ceramic edges).

One edge, on which a profile of the first cement was to be applied, was then pretreated with a cleaner. To clean the pane edge, the product obtainable on the market under the tradename "Sika Cleaner 205" is appropriate. After any solvents present in the cleaning agent were completely evaporated (adherence to a certain aeration period), a primer was applied to the cleaned pane edge (for example, the product obtainable on the market under the tradename "Sika Primer 206 J" which is a so-called black primer). After applying the primer, a certain aeration period was adhered to so that the corresponding solvents were completely evaporated from the pane surface.

Then, the profile of the first cement in the form of a so-called worm was applied to the pane edge. The cement used was a cement with polyurethane prepolymer base with free, reactive isocyanate groups. This profile of the first cement immediately showed good adhesion to the pane edge and was stable immediately after application, i.e. no collapse or deformation of the applied cement profile occurred. This first cement profile was then allowed to harden completely under the influence of surrounding humidity.

After hardening, the profile of the first cement functioned as a range spacer during cementing and a cement deterrent, and covered the flange.

A vehicle pane provided with the first cement profile was packed up and delivered to the manufacturer of the vehicles after complete hardening of the first cement.

The vehicle manufacturer then applied the profile of the second cement inside the profile of the first cement, and this profile was still moldable after application, but already had achieved good stability. The application of this second cement profile which had adhesive characteristics took place in the form of a profile with a triangular cross-section. This so-called active worm was therefore designated as a triangular worm.

The triangular worm was positioned on the vehicle in such a way that it was applied either on the surface of the black primer and/or on the surface of the ceramic edge. Before application on the ceramic edge, the surface was appropriately cleaned again; e.g., with the product obtainable on the market under the tradename Sika Cleaner 205. The profile of the second cement was once again a profile of a prepolymer with free, reactive isocyanate groups, namely a corresponding polyurethane cement. Typical examples of such cements are described in European Patent Nos. 0,244,608 and 0,255,572 assigned to SIKA AG. Such a product is obtainable on the market under the tradename Sikaflex-250 BD-1.

A few minutes after applying the profile of the second cement, the pane was inserted into the vehicle flange. By the humidity of the surroundings, the reticulation of the prepolymeride with free isocyanate groups was initiated and it occurs more quickly or more slowly depending on climate. In general, two hours after mounting the vehicle pane, this second cement hardened enough so that all attachment aids could be removed from the vehicle.

Achieving complete solidity values also depends on climatic conditions, and after complete hardening, the corresponding connection point was not only solid and adhering, but it also had elastic characteristics. Final hardening when reaching the full solidity values of the cement was generally reached at temperatures of 15°-20° C. and at a humidity of 60-80% after about seven days.

As a comparison, the procedure above was followed but the profile of the first cement was not a profile with a triangular cross-section, but rather a profile with a roughly trapezoidal cross-section, with the longer parallel side of the trapeze cemented to the primer. The shorter upper parallel side of the trapeze was furthermore provided with a recess in such a way that the cement profile had a groove on its upper side.

After the complete hardening of the first cement, the adhesive second cement in the form of a profile was cemented into the groove of the profile. Immediately afterwards, pressure was applied to this arrangement in such a way that the still moldable profile of the adhesive second cement was pressed solidly into the groove.

In the comparative example, the profile consisted of a first cement of an identical cement as the one that was used in the above example according to the invention.

Furthermore, the profile of the second cement, still adhesive at the time of cementing, was identical to the cement of the above example according to the invention; i.e., the active cement was also the product that can be obtained on the market under the tradename Sikaflex-250 BD-1.

The two cemented products were then tested. After applying the profiles of the second, still adhesive cement to the glass plate or to the profile of the first cement, pressure was applied in both cases and then the glass plates were stored with the applied profiles according to the following procedure:

1. 14 days at 20° and 50% relative humidity
2. As in 1 with additional 7-day water storage
3. As in 1 with additional 14-day storage at 60° C. and 100% relative humidity (Cataplasm test)

After these storages, the adhesion of the profiles of active cement to the glass body or the profile of the hardened cement was tested, with the cemented point being subjected to such a great stress that a rupture occurred in all cases. In numerous cases the break occurred inside the originally applied profile and this is designated a cohesive break. This is a sign of a flawless adhesion. In numerous cases the break line ran in such a way that part of the break occurred at the retaining point of the cement, but part occurred in the mass of the cement itself. This is designated partly cohesive, partly adhesive, and indicates a critical adhesion.

If the break takes place exclusively at the point where the cement is anchored, however, i.e., either on the glass plate or on the profile of the first cement, then this shows an insufficient adhesion. The quality of the adhesion was evaluated as either a three (optimal), two (critical adhesion) or one (insufficient adhesion).

In the example according to the invention, a three was obtained for all three types of storages. In the example for comparison purposes, however, a one was obtained in most cases and a two in numerous cases, essentially depending on which aging process was applied. These tests showed, however, that after a 28-day aging of the profile of the first cement, a two was only achieved in a few cases. The evaluation was usually a one. In all cases where the profile of the second cement was applied only after 72 days or after 120 days to the profile of the first cement, an adhesion of one was achieved.

In a further comparative example, the cement profile of the first cement was also produced from the cement Sika-flex-250 BD-1. A second profile also of the cement Sikaflex-250 BD-1 was applied after a 72-day aging or 120-day aging on the first cement profile. In this case, for identical cement composition of the first profile of the hardened cement and of the second profile not yet hardened at time of cementing, the adhesion of the second cement after hardening was unsatisfactory. The results were essentially the same as for the first tests, i.e. only ones and twos could be achieved, but never a three.

The characteristics of Sikaflex-150 BD-1 used in the above examples was as follows:

| | |
|---|---|
| Density: | 1.18 ± 0,03 g cm$^3$, |
| Stability: | Very good, |
| Curing method: | moisture of the air, |
| Time until a skin is formed: | about 25 min. at 23° C. and 50% relative humidity, |
| Curing speed of the profile: | 4 mm per day, |
| Shore A hardness (DIN 53505): | 60, |
| Tensile strength (DIN 53504): | 4.5–5.5 N/mm$^2$, |
| Elongation at break (DIN 53504): | 400–500%, |
| Tear propagation 53 515: | 12 N/mm, |
| Tensile shear strength after the stated curing time at 23° C. and 50% relative humidity; | |
| after 1 hour: | .0.05–0.10 N/mm$^2$, |
| after 5 hours: | 0.50–0.70 N/mm$^2$, |
| after 15 hours: | 1.40–1.60 N/mm$^2$, |
| after 1 week: | 4.00–4.50 N/mm$^2$, |
| Temperature range to which the adhesive bond can be submitted (temperature at use): | −40° C. to +90° C. |
| Temperature resistance (temporary) | +120° C. |
| Storability: | 9 months |
| Color: | Black. |

Sika-cleaner 205 had the following characteristics:

| | |
|---|---|
| Density: | 0.79 kg/l, |
| Color: | colorless, |
| Boiling point: | 83° C., |
| Flame point: | 14° C., |
| Storing conditions: | cool and dry, |
| storable | for one year. |

Sika-cleaner 205 is a cleaning solution for the pretreatment of surfaces on which an adhesive is applied and it is specially suited for surfaces of glass, ceramics, metal and several plastic materials, as well as varnishes. Usually the cleaning solution will be rubbed with a patch onto the surfaces to be cleaned. The clean surface will be left for 10 minutes (exhausting time) until an adhesive or primer is applied.

Sika primer 206 J described above had the following characteristics:

| | |
|---|---|
| Density: | 1.0 kg/l, |
| Color: | black fluid, |
| Viscosity: | about 15 mPa.s, |
| Total content of solid constituents: | about 32%, |
| Flame point: | −2° C., |
| Storage: | dry and cool. |

The primer provided protection against ultraviolet radiation. It has good weathering stability and temperature stability, as well as a good adherence to different substrates like glass, metals, plastic materials and varnishes.

What is claimed is:

1. A windshield suitable for bonding to a vehicle frame comprising a glass windshield substrate including a layer essentially impermeable to ultraviolet light and/or a primer layer on the outer edge area of said windshield substrate, said windshield having thereon a solidified range spacer of a first adhesive material located in the outer edge area of the windshield substrate, and an adhesive profile of a second adhesive material also located in the outer edge area of the windshield substrate but inside the range spacer, wherein the range spacer of the first adhesive material contacts at least one of the glass windshield substrate, the layer essentially impermeable to ultraviolet light and the primer layer, and wherein the adhesive profile of the second adhesive material contacts at least two of the glass windshield substrate, the layer essentially impermeable to ultraviolet light, and the primer layer.

2. A windshield according to claim 1, further comprising a means for protecting the adhesive profile of the second adhesive material from contact with water.

3. A glass body suitable for cementing to another material, said body comprising a glass substrate including at least one of a layer essentially impermeable to ultraviolet light and a primer layer on a surface in the outer edge area of the glass substrate, said glass substrate having thereon a profile of a first adhesive material located in the outer edge area of the glass substrate, wherein the profile of the first adhesive contacts at least one of the glass substrate, the layer essentially impermeable to ultraviolet light, and the primer layer, and a profile of a second adhesive wherein the profile of the second adhesive contacts at least two of the glass substrate, the layer essentially impermeable to ultraviolet light, and the primer layer, said first adhesive being solidified while said second adhesive still has adhesive characteristics.

4. A glass body according to claim 3, comprising additional profiles of the first adhesive in the outer edge portion of the glass substrate, but inside the area of the glass substrate containing the first profile.

5. A glass body according to claim 4, comprising additional profiles of the second adhesive in the outer edge portion of the glass substrate, but inside the area of the glass substrate containing the first profile.

6. A glass body according to claim 3, wherein the first profile of the second adhesive is located in the outer edge portion of the glass substrate, but inside the area of the glass substrate containing the first profile.

7. A glass body according to claim 3, at least one of said second adhesive and said first adhesive is stable and pasty before hardening or complete hardening, or curing, and is solid and flexible and/or elastic after complete hardening or curing.

8. A glass body according to claim 3, wherein at least one of the second adhesive and the first adhesive is an elastomer selected from the group consisting of polyurethanes, silicones, polysulfides, and synthetic and natural rubbers, a duromer which is made flexible and selected from the group consisting of epoxides, phenol resins and polyurethanes or a thermoplastic selected from the group consisting of polyvinylchlorides, polyamides, acrylic resins and thermoplastic rubber combinations.

9. A glass body according to claim 3, wherein at least one of the second adhesive and the first adhesive is made of a two-component adhesive or a reactive one-component adhesive, wherein the two-component adhesive is based on a component with at least one free isocyanate group and a hardener component, and wherein the one-component adhesive is based on a component with at least one free isocyanate group, wherein hardening of the one-component adhesive can be carried out by reaction of at least one free isocyanate group with water or humidity of the surroundings, and/or when a hardener is present in the composition, by activation of the hardener by heating and/or by activation of the hardener by the influence of water.

10. A glass body according to claim 3, wherein the profile of the second adhesive, or a partial area thereof, has a cross-section in the form of a triangle, is stable and pasty, and upon interaction with outside forces upon bonding, is permanently moldable and provides a solid connection with elastic characteristics after complete hardening and crosslinking.

11. A glass body according to claim 3, said profile of the first adhesive being a packing washer.

12. A glass body according to claim 3, wherein the glass body is a vehicle pane, a window pane, a laminated glass pane, a steel plate coated with glass, or a multiple pane glass body.

13. A glass body according to claim 4, a profile of the first adhesive containing a contact adhesive in the upper area thereof.

14. A glass body according to claim 5, wherein at least one profile of the second adhesive is a prepolymer or contains a prepolymer, said prepolymer and/or a hardener in the second adhesive providing a complete hardening and crosslinking of the second adhesive while forming a solid and flexible and/or elastic product under the influence of water, said profile of the second adhesive being protected from the access of humidity by a protective layer or corresponding packaging.

15. A glass body according to claim 3, said glass substrate including a layer essentially impermeable to ultraviolet light and a primer layer, wherein the layer essentially impermeable to ultraviolet light is present on a surface in the outer edge area of the glass substrate and the primer layer is superimposed only in the outer area of the layer impermeable to ultraviolet light, wherein the profile of the first adhesive material is a packing washer which contacts only the surface of the primer, and the profile of the second adhesive directly contacts both the primer layer and the layer essentially impermeable to ultraviolet light.

16. A process for manufacturing a glass body according to claim 3 comprising a glass substrate including at least one layer selected from a layer essentially impermeable to ultraviolet light and a primer layer on a surface in the outer edge area of the glass substrate, said process comprising (i) applying a profile of a first adhesive to the outer edge area of the glass body, either completely or at least partially in contact with the layer essentially impermeable to ultraviolet light and/or the layer of primer, said first adhesive being pasty and stable and not being hardened or completely hardened or cured upon application, (ii) allowing the profile of the first adhesive to harden and crosslink after application, the hardened first adhesive being solid and flexible and/or elastic, and (iii) applying a profile of a second adhesive inside the profile of the outermost profile of the first adhesive, said second adhesive being stable and pasty before its hardening or complete hardening or crosslinking, but permanently moldable under the influence of outside forces and solid and flexible and/or elastic after complete hardening and crosslinking, said profile of the second adhesive being applied to contact at least two of the glass substrate, the layer essentially impermeable to ultraviolet light and the primer layer, and the complete hardening of said profile of second adhesive being initiated only upon adhering the glass body to a further material and/or immediately before adhering the glass body to a further material.

17. A process according to claim 16, further comprising adhering the glass body to at least one other material, said process comprising (iv) adhesively contacting the profile of second adhesive of the glass body with the other material under the influence of outside forces such that the profile of the second adhesive is permanently molded and remains adhered to the other material while the previously solidified profile of the first adhesive present on said glass body serves as a range spacer, and (v) complete hardening and crosslinking of the second adhesive to form a solid intermediate layer, said intermediate layer being flexible and/or elastic.

18. A process according to claim 16, wherein the profile of the second adhesive is present in a non-hardened or not completely hardened or cured state, and complete hardening or crosslinking of the second adhesive is initiated only after the glass body is contacted with another material under pressure.

19. A process according to claim 16, wherein prior to applying the glass body to another material, the profile of the second adhesive is applied to a prefabricated structure of the glass substrate and profile of the first adhesive, said profile of second adhesive being applied either at a location remote from that where the glass body is applied to the other material and the glass body further comprises a means to prevent the hardening or complete hardening or crosslinking of the profile of the second adhesive during storage of the glass body prior to application to the other material, or applied immediately before the glass body is adhered to the other material at the location of bonding.

* * * * *